United States Patent

Brandenstein et al.

[11] Patent Number: 6,146,301
[45] Date of Patent: Nov. 14, 2000

[54] SUPPORT BODY FOR TENSIONING DEVICE

[75] Inventors: Manfred Brandenstein, Eussenheim; Wolfgang Friedrich, Schweinfurt; Roland Haas, Hofheim; Roland Harich, Höchheim; Gerhard Herrmann, Schweinfurt; Bruno Schemmel, Geldersheim; Josef Stork, Gerolzhofen, all of Germany

[73] Assignee: SKF GmbH, Schweinfurt, Germany

[21] Appl. No.: 09/152,052

[22] Filed: Sep. 11, 1998

[30] Foreign Application Priority Data

Sep. 11, 1997 [DE] Germany ............... 197 39 816

[51] Int. Cl.$^7$ .............. F16H 55/14; F16H 7/08; F16H 7/12
[52] U.S. Cl. .............. 474/135; 474/101; 474/94; 474/903
[58] Field of Search .............. 474/113, 101, 474/133, 94, 903, 135

[56] References Cited

U.S. PATENT DOCUMENTS

| | | |
|---|---|---|
| 3,606,497 | 9/1971 | Gilles .............. 474/94 |
| 4,472,162 | 9/1984 | Hitchcock .............. 474/135 |
| 4,474,562 | 10/1984 | Heurich .............. 474/133 |
| 5,234,385 | 8/1993 | Kawashima et al. .............. 474/94 |
| 5,308,289 | 5/1994 | Funahashi .............. 474/94 |
| 5,324,237 | 6/1994 | Bilsing et al. .............. 474/94 |
| 5,399,124 | 3/1995 | Yamamoto et al. .............. 474/94 |
| 5,441,456 | 8/1995 | Watanabe et al. .............. 474/94 |
| 5,470,279 | 11/1995 | Brandenstein et al. .............. 474/135 |

FOREIGN PATENT DOCUMENTS

| | | |
|---|---|---|
| 40 15 025 | 1/1992 | Germany . |
| 2 158 547 | 11/1985 | United Kingdom . |

*Primary Examiner*—David A. Bucci
*Assistant Examiner*—Matthew A. Kaness
*Attorney, Agent, or Firm*—Burns, Doane, Swecker & Mathis, L.L.P.

[57] ABSTRACT

A support body used in a tensioning device includes a support element and a bottom plate. The support element is attached to the bottom plate in a radially and axially form-fitting and fixed manner through use of a plastic element that is molded into place by extrusion. The plastic element engages a groove formed in the outer surface of the support element and also engages through holes formed in the bottom plate.

22 Claims, 2 Drawing Sheets

SUPPORT BODY FOR TENSIONING DEVICE

This application corresponds to and claims priority under 35 U.S.C. § 119 with respect to German Application No. P 19739816.2 filed on Sep. 11, 1997, the entire content of which is incorporated herein by reference.

FIELD OF THE INVENTION

The present invention generally relates to a support body used in tensioning devices. More particularly, the present invention pertains to a support body for tensioning devices that is constructed of a support sleeve and a bottom plate that are radially and axially fixed relative to one another.

BACKGROUND OF THE INVENTION

DE 40 15 028 and corresponding U.S. Pat. No. 5,470,279 describe a tensioning device for drive belts provided with a support body. An essentially cylindrical support element is provided with a shoulder with which it is pressed into a bottom plate and caulked in place. This creates a generally tight axial and radial connection. The support element is provided with a bore for a bolt, so that the bottom plate and the support element can be fixed on a motor block. The bolt thus forms the actual attachment, while the connection of the support element and the bottom plate are no longer important during operation, following the installation. The body forms a compact unit for supporting the spring forces and, if needed, for adjustment.

However, one drawback and disadvantage associated with the arrangement described above is that pressing-in and caulking require large forces. It is possible that as a result of unavoidable tolerances in serial production, a slight deformation of the components takes place.

A need thus exists for a tensioning device that is not susceptible of the same disadvantages and drawbacks discussed above.

It would be desirable to provide a tensioning device which does not require pressing-in and caulking so that deformation of the components does not occur.

It would also be desirable to provide a tensioning device that, in addition to being capable of avoiding deformation of the components during the connection, is well suited to being manufactured relatively inexpensively.

SUMMARY OF THE INVENTION

In accordance with the present invention, the support element forming a part of the tensioning device is attached to the bottom plate in a radially and axially form-fitting manner through use of a plastic element that is molded into place by extrusion. During connection of the support element to the bottom plate, the bottom plate and the support element are placed on top of each other and properly positioned relative to one another. This can be done in a suitable molding tool. The plastic can then be extruded around the support element and the bottom plate with no forces acting on the components. This advantageously eliminates the risk of deformation of the parts.

According to one aspect of the invention, a support body for a tensioning device includes a bottom plate provided with a through bore and a support sleeve provided with a through bore that communicates with the through bore in the bottom plate to permit a bolt to pass through the bore in the support sleeve and the bore in the bottom plate to secure the support body on a motor block. The support body also includes a plastic connecting member that engages an element provided on the support sleeve and an element provided on the bottom plate to radially and axially fix the support sleeve on the bottom plate.

According to another aspect of the invention, a support body for a tensioning device includes a bottom plate provided with a through bore and a support element provided with a through bore that communicates with the through bore in the bottom plate to permit a bolt to pass through the bore in the support element and the bore in the bottom plate to secure the support body on a motor block. The support element is attached to the bottom plate in a radially and axially fixed manner by way of an extrusion molded plastic element.

Another aspect of the invention involves a support body for a tensioning device includes a bottom plate provided with a through bore and a support sleeve provided with a through bore that communicates with the through bore in the bottom plate to permit a bolt to pass through the bore in the support sleeve and the bore in the bottom plate to secure the support body on a motor block. A plastic connecting piece engages the outer surface of the support sleeve and is fixedly connected to the bottom plate to radially and axially fix the support sleeve relative to the bottom plate.

BRIEF DESCRIPTION OF THE DRAWING FIGURES

The foregoing and additional features and characteristics associated with the present invention will become more apparent from the following detailed description considered with reference to the accompanying drawing figures in which like reference numerals designate like elements and wherein.

DETAILED DESCRIPTION OF THE INVENTION

Figure 1:
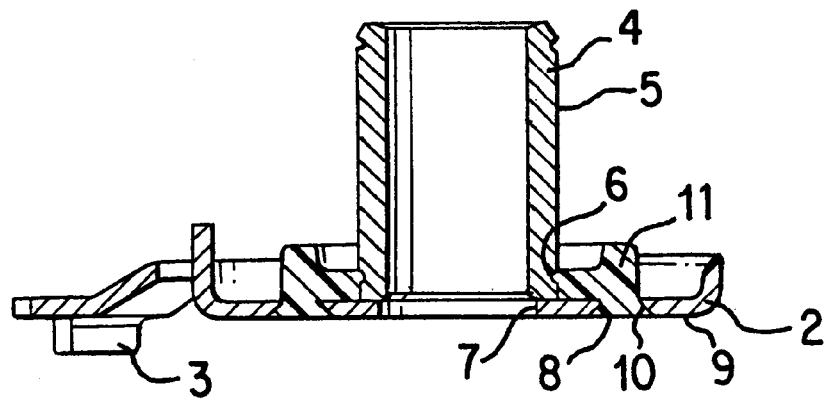
FIG. 1 is a longitudinal cross-sectional view of a support body with a rigidly connected support sleeve in accordance with one embodiment of the present invention.
Figure 2:
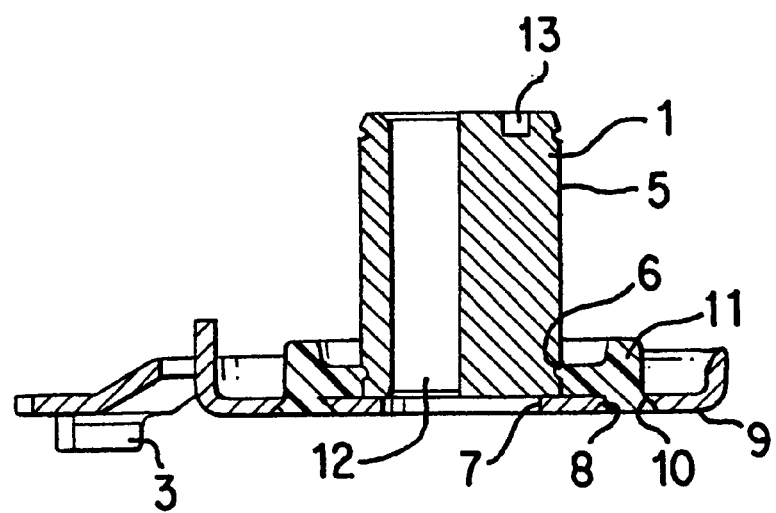
FIG. 2 is a longitudinal cross-sectional view of a support body with a rotatably attached adjustment cam in accordance with another embodiment of the present invention.

The support bodies shown in FIGS. 1 and 2 form part of a tensioning device for drive belts. Each support body is adapted to be attached by means of a bolt on a motor block and carry a tensioning roll capable of swiveling. Generally speaking, the support body includes a cylindrical support sleeve or element 4 and a bottom plate 2 as seen in FIGS. 1 and 2. In versions of the support body embodying an adjustment cam, a projection 3 is notched from the bottom plate 2 and is adapted to engage with a corresponding bearing bore in the motor block to thus form the swivel axis for setting the clamping device. The adjustment cam 1 can be accommodated directly in the support sleeve as seen in the embodiment of FIG. 2. Alternatively, the adjustment cam can be inserted into the support sleeve 4 such as would be the case with the embodiment shown in FIG. 1.

Figure 3:
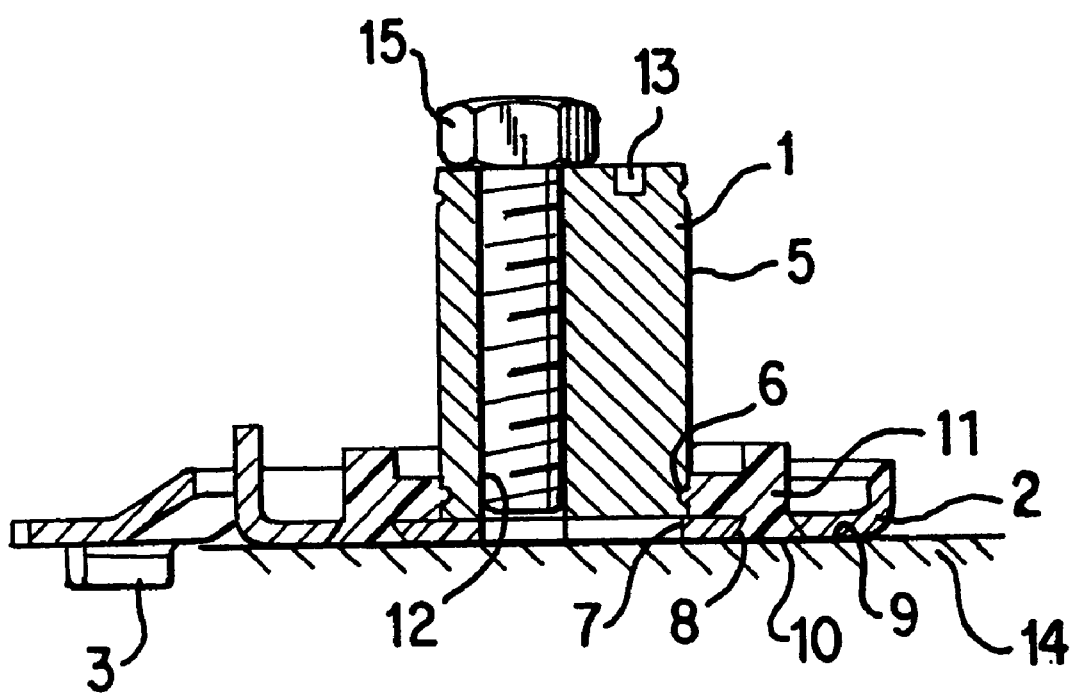
FIG. 3 is a longitudinal cross-sectional view of the support body shown in FIG. 2 mounted on a motor block by way of a bolt.

The tensioning device with which the support body of the present invention is used is generally the same as described in U.S. Pat. No. 5,470,279, the entire contents of which is incorporated herein by reference. Because the details relating to the construction and operation of the tensioning device are known, a detailed description will not be included here. However, for purposes of illustration, FIG. 3 shows the support body of FIG. 2 mounted on a motor block 14 by way of a bolt 15, it being understood that the other features and details of the tensioning device as described in the aforementioned U.S. Pat. No. 5,470,279 are not illustrated for purposes of ease in understanding. The support body shown in FIG. 1 is similarly adapted to be mounted on a motor block by way of a bolt.

As seen with reference to FIG. 1 illustrating one embodiment of the support body of the present invention, the upstanding cylindrical support sleeve 4 is hollow and is provided with a cylindrical outer surface 5 that is used as a slide bearing for a working cam. Both ends of the outer surface 5 of the cylindrical support sleeve 4 are provided with an annular groove 6. The bottom plate 2 is provided with a through bore 7 that is at least as large in diameter as the bore in the support sleeve 4. A plurality of through holes 8 are formed in the bottom plate 2 and are distributed on a pitch circle at locations radially outwardly of the central through bore 7. These through holes 8 are countersunk on the mounting surface 9 of the bottom plate 2 to possess a larger diameter 10 at the ends of the holes 8 located closest to the mounting surface 9.

The support sleeve 4 is connected to the bottom plate by way of a one piece unitarily formed connecting piece 11 that engages a detail provided on the support sleeve 4 and detail provided on the bottom plate 2. More specifically, the support sleeve 4 is connected to the bottom plate by way of an extruded plastic element 11 that engages the groove 6 on the outer surface of the support sleeve and the through holes 8 in the bottom plate 2.

The manner in which this connection between the support sleeve 4 and the bottom plate 2 is effected is as follows. First, the support sleeve 4 is set onto the bottom plate 2 at the proper position with respect to the bottom plate 2 (i.e., so that the through bore in the support sleeve 4 communicates with and is positioned with respect to the through bore 7 in the bottom plate 2 in the manner illustrated in FIG. 1). The support sleeve 4 and the bottom plate 2 are placed in a tool (not shown) that is adapted to extrude a plastic mass forming an annular plastic element 11 that connects the support sleeve 4 to the bottom plate 2. The plastic mass flows into the annular groove 6 that is formed in the outer surface 5 of the support sleeve 4 at the end of the sleeve 4 located closest to the bottom plate 2. The plastic mass also flows into the through holes 8 in the bottom plate 2. After the plastic cools, the support sleeve 4 is connected to the bottom plate 2 in an axially and radially form-fitting and fixed manner. In this embodiment, the support element or sleeve 4 is rotationally fixed with respect to the bottom plate 2.

In the embodiment shown in FIG. 2, a large cylindrical adjustment cam 1 with an eccentric bore 12 is provided for an attachment bolt (not shown) which also forms the swivel bearing for the adjustment. The adjustment cam serves as a support sleeve or element. The upstanding cylindrical adjustment cam 1 is hollow and is provided with a cylindrical outer surface 5. Both ends of the outer surface 5 of the cylindrical support sleeve 4 are provided with an annular groove 6. The bottom plate 2 is provided with a through bore 7 that is larger in diameter than the bore in the support sleeve 4. A plurality of through holes 8 are formed in the bottom plate 2, with the through holes 8 being distributed along a pitch circle at locations radially outwardly of the central through bore 7. The through holes 8 are countersunk on the mounting surface 9 of the bottom plate 2 so that the ends of the holes 8 located closest to the mounting surface 9 possess a larger diameter 10 than the opposite ends.

In the same manner described above in connection with the FIG. 1 embodiment, the support sleeve or adjustment cam 1 is connected to the bottom plate 2 by way of a one piece, unitarily formed extruded plastic connecting piece 11 that engages the groove 6 on the support sleeve or adjustment cam 1 as well as the through holes 8 in the bottom plate. The formation of the plastic piece 11 for connecting the support sleeve 4 to the bottom plate 2 is the same as that described above. Before the extrusion of the plastic mass for forming the plastic connecting piece 11, however, the surfaces that are to contact the plastic element 11, including the annular groove 6, can be wetted with a temperature-resistant lubricant. This helps prevent a torsional fixation through the surface structure. After cooling, the adjustment cam 1 can be rotated relative to the bottom plate 2 and the connecting piece 11 via operating bores 13 that are provided on the end of the adjustment cam 1 opposite the bottom plate 2 in order to move the adjustment cam to the drive belt.

The plastic connection piece 11, which in the above-described embodiments is constructed in an annular shape, can also be formed of separate segments which engage with differently shaped recesses in the support element 1, 4 and the bottom plate 2.

The present invention thus provides a support body for a tensioning device that is not susceptible to deformation of the parts forming the support body. The use of the plastic connecting piece and the way in which such piece is formed with respect to the support element and the bottom plate eliminates the application of forces to the support element and the bottom plate that might otherwise cause undesirable deformation. Further, the connection can be achieved rather quickly and with little expense thus providing further advantages.

The principles, preferred embodiments and modes of operation of the present invention have been described in the foregoing specification. However, the invention which is intended to be protected is not to be construed as limited to the particular embodiments described. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the invention be embraced thereby.

What is claimed is:

1. Support body for a tensioning device comprising a bottom plate provided with a through bore and a support element provided with a through bore that communicates with the through bore in the bottom plate to permit a bolt to pass through the bore in the support element and the bore in the bottom plate to secure the support body on a motor block, and including an extrusion molded plastic connecting member that engages a detail on said support element and a detail provided on said bottom plate to radially and axially fix the support element on said bottom plate, thus avoiding application of forces to and deformation of said support element and said bottom plate.

2. Support body according to claim 1, wherein said detail on said support element that is engaged by the plastic connecting member is a groove formed in an outer surface of said support element, said groove being provided adjacent an end of the support element located closest to said bottom plate.

3. Support body according to claim 1, wherein said detail on said bottom plate that is engaged by the plastic connecting member includes a plurality of through holes provided in said bottom plate.

4. Support body according to claim 3, wherein said through holes in said bottom plate are positioned radially outwardly of the though bore in said bottom plate.

5. Support body according to claim 3, wherein said support element is located on a first side of the bottom plate, said bottom plate including a second side located on an opposite side of the bottom plate from said first side, said through holes in the bottom plate having a larger diameter on the second side of the bottom plate than on the first side of the bottom plate.

6. Support body according to claim 1, wherein said plastic element is annular in shape.

7. Support body according to claim 1, wherein said support element is constructed as an adjustment cam and is rotationally movable in relation to the connecting member and the bottom plate.

8. Support body for a tensioning device comprising a bottom plate provided with a through bore and a support element provided with a through bore that communicates with the through bore in the bottom plate to permit a bolt to pass through the bore in the support element and the bore in the bottom plate to secure the support body on a motor block, said support element being attached to the bottom plate in a radially and axially fixed manner by way of an extrusion molded plastic element, thus avoiding application of forces to and deformation of said support element, and said bottom plate.

9. Support body according to claim 8, wherein said support element includes an outer surface provided with a groove at an end of the support element closest to said bottom plate, said plastic element filling said groove.

10. Support body according to claim 8, wherein said bottom plate includes a plurality of through bores distributed circumferentially along said bottom plate, said plastic element filling said through bores in the bottom plate.

11. Support body according to claim 10, wherein said support body is located on a first side of the bottom plate, said bottom plate including a second side located on an opposite side of the bottom plate from said first side, said through holes in the bottom plate having a larger diameter on the second side of the bottom plate than on the first side of the bottom plate.

12. Support body according to claim 8, wherein said plastic element is annular in shape.

13. Support body according to claim 8, wherein said support element is constructed as an adjustment cam and is rotationally movable in relation to the plastic element and the bottom plate.

14. Support body according to claim 8, wherein the entirety of said support element is located exteriorly of said through bore in said bottom plate.

15. Support body for a tensioning device comprising a bottom plate provided with a through bore and a support element provided with a through bore that communicates with the through bore in the bottom plate to permit a bolt to pass through the bore in the support sleeve and the bore in the bottom plate to secure the support body on a motor block, said support sleeve having an outer surface, and including a plastic connecting piece filling a groove formed in the outer surface of said support sleeve and being fixedly connected to the bottom plate to radially and axially fix the support sleeve relative to said bottom plate.

16. Support body according to claim 15, wherein said plastic connecting piece is fixed to said bottom plate by virtue of a portion of the connecting piece filling a plurality of spaced apart through holes provided in said bottom plate.

17. Support body according to claim 16, wherein said through holes in said bottom plate are positioned radially outwardly of the through bore in said bottom plate, said through holes in said bottom plate having a diameter at one portion that differs from a diameter at another portion.

18. Support body according to claim 15, wherein said support sleeve is constructed as an adjustment cam and is rotationally movable in relation to the connecting piece and the bottom plate.

19. Support body according to claim 15, wherein the entirety of said support element is located exteriorly of said through bore in said bottom plate.

20. Support body for a tensioning device comprising a bottom plate provided with a through bore and a support sleeve provided with a through bore that communicates with the through bore in the bottom plate to permit a bolt to pass through the bore in the support sleeve and the bore in the bottom plate to secure the support body on a motor block, said support sleeve having an outer surface, and including a plastic connecting piece engaging the outer surface of the support sleeve and being fixedly connected to the bottom plate by virtue of a portion of the connecting piece filling a plurality of spaced apart through holes provided in said bottom plate to radially and axially fix the support sleeve relative to said bosom plate.

21. Support body according to claim 20, wherein said through holes in said bottom plate are positioned radially outwardly of the through bore in said bottom plate, said through holes in said bottom plate having a diameter at one portion that differs from a diameter at another portion.

22. Support body according to claim 20, wherein said support sleeve is constructed as an adjustment cam and is rotationally movable in relation to the connecting piece and the bottom plate.

* * * * *